(12) United States Patent
Akbar

(10) Patent No.: US 8,005,619 B2
(45) Date of Patent: Aug. 23, 2011

(54) METHOD OF DETERMINING RESERVOIR PARAMETERS

(75) Inventor: Mahmood Akbar, Al-Khobar (SA)

(73) Assignee: Schlumberger Technology Corporation, Cambridge, MA (US)

(*) Notice: Subject to any disclaimer, the term of this patent is extended or adjusted under 35 U.S.C. 154(b) by 605 days.

(21) Appl. No.: 12/101,221

(22) Filed: Apr. 11, 2008

(65) Prior Publication Data
US 2009/0259403 A1    Oct. 15, 2009

(51) Int. Cl.
*G01V 3/38* (2006.01)
(52) U.S. Cl. .................... 702/7; 324/303
(58) Field of Classification Search ............. 702/6, 7, 702/8, 11; 324/303, 338, 368, 376
See application file for complete search history.

(56) References Cited

U.S. PATENT DOCUMENTS

| | | | |
|---|---|---|---|
| 4,924,187 | A | 5/1990 | Sprunt et al. |
| 5,493,226 | A | 2/1996 | Honarpour et al. |
| 6,879,154 | B2 | 4/2005 | Fleury |
| 2002/0177954 | A1* | 11/2002 | Vail, III ................ 702/7 |

OTHER PUBLICATIONS

Neustaedter, R.H., et al., Log Evaluation of Deep Ellenburger Gas Zones, Deep Drilling and Development Symposium—Delaware Basin, Society of Petroleum Engineers of AIME, Texas, Mar. 1968, SPE 2071, pp. 1-7.
Nugent, W.H., et al., A New Approach to Carbonate Analysis, 19th Annual Logging Symposium, Society of Petrophysicists & Well Log Analysts, Jun. 1978, Transactions of the SPWLA Paper O, pp. 1-10.
Sethi, D.K., et al. Dome Considerations About the Formation Resistivity Factor—Porosity Relations, 20th Annual Logging Symposium, Society of Petrophysicists & Well Log Analysts, Jun. 1979, Transactions of the SPWLA Paper L, pp. 1-12.
Amin, A.T., et al., Accurate Estimation of Water Saturations in Complex Carbonate, Fifth Society of Petroleum Engineers Middle East Oil Show, Bahrain, Mar. 1987, SPE 15714, pp. 199-214.
Borai, A.M., et al., A New Correlation for Cementation Factor in Low-Porosity Carbonates, Society of Petroleum Engineers Formation Evaluation, Dec. 1987, SPE 14401, pp. 495-499.
Frailey, S.M., et al., Simultaneous Calculation of Archie Parameters m, n and a, West Texas Geologic Society Fall Symposium Proceedings, Oct. 2002, Midland, Texas, pp. 1-13, from http://www.depts.ttu.edu/peWeb/research/caprs/caprsPapers/ArchieParameters.pdf.

* cited by examiner

*Primary Examiner* — John H Le
(74) *Attorney, Agent, or Firm* — Brigid Laffey; Rachel Greene; Helene Raybaud

(57) ABSTRACT

A method of determining the effect of formation porosity on formation resistivity and parameters derived from the formation resistivity is described, including the step of determining for a depth interval a heterogeneity measure; and using a pre-defined relation to transform the heterogeneity measure into an algebraic term determining the effect of the formation porosity on the formation resistivity, based for example on Archie's law or similar relations.

9 Claims, 4 Drawing Sheets

METHOD OF DETERMINING RESERVOIR PARAMETERS

FIELD OF THE INVENTION

The invention relates to well logging methods, their interpretation and application, and, more specifically, to methods for interpreting well logging data in order to derive parameters pertaining to the relative amount of hydrocarbons and water in subterranean reservoirs, particularly for carbonate reservoirs.

BACKGROUND

It is generally accepted that the interpretation and use of logging data obtained from carbonate reservoirs pose significant technical and scientific challenges. Most methods introduced for siliciclastic formations are inadequate for predicting the producibility of carbonate formations due to the complexity of their texture and pore structures and their distribution. Carbonate rock are much more than sandstones subject to a process termed diagenesis. Diagenesis alters the pore size and distribution through a number of geochemical reactions, such as chemical dissolution and reprecipitation, dolomitization, and fracturing. The shape and size of the pore network in carbonate rock is often heterogeneous even on a small scale.

Using logging measurements to derive an accurate estimate of important formation parameters, such as saturation and recovery rates, is in principle a well established procedure. However many of the predictions and estimates based on known methods depend on using fixed values for unknowns in mathematical relations which link directly measureable well logging parameters to those of interest for predicting the future production of hydrocarbons. Among the most important of these relations used in the oilfield are a group of equation in general referred to "Archie's Laws".

Archie's laws link water saturation of a formation to its measureable resistivity. They are usually presented in a form such as $$R = a*Rw/(\phi^{**}m)*(S^{**}n), \quad [1]$$

in which R is the resistivity as measured in log measurements, a is a formation factor set usually to 1 in the absence of any other data, Rw the resistivity of water in the formation, $\phi$ is the porosity as measured from density, neutron or sonic logging tools or magnetic resonance or NMR logging tools and S is the water saturation within the measured volume. The two exponents m and n in equation [1] are collectively known as Archie's exponents or, respectively, as cementation exponent and saturation exponent. The saturation exponent n varies widely depending on the wettability of the formation and is usually assumed to be in the range between 1.6 and 8. The cementation exponent m is taken to be around 2. However these values are typically the result of core tests performed in the laboratory and extrapolated to downhole formations of similar type and locations.

It is the ultimate goal of equations such as equation [1] to determine the oil or water saturation of the formation unperturbed by the invasion of drilling fluid as used in the drilling of the logged well. These saturations together with an estimate of the recoverable part of the oil saturation ultimately determine the economic viability of any field development and production planning. As can be seen from the structure of Archie's laws, minor variations in the value of m and n have a significant impact on the estimate of the water saturation. And whilst tools and methods for measuring the resistivity R and the porosity $\phi$ have greatly improved over time, the determination of the exponents has been mainly left to evaluating plausible physical models for the conductivity of porous media.

As the result of such modeling, several relations have been proposed to link the cementation exponent m to measureable parameters. Some of these relations are listed below as equations [2]-[5]:

$$m = 0.019/\phi + 1.87, \quad [2]$$

$$m = (2*\log \phi(s))/(\log \phi(t)), \quad [3]$$

$$m = 2.05 - \phi, \text{ and} \quad [4]$$

$$m = 2.2 - 0.035/(\phi + 0.042). \quad [5]$$

Wherein $\phi$ denotes the porosity in general, $\phi(s)$ the porosity measured by a sonic tool and $\phi(t)$ the total porosity as determined for example from nuclear porosity logs.

A further derivation of the parameter m based on the evaluation of log measurements is described by M. Wafta et al. in SPE 15714 (1987). The authors use the output of an Electromagnetic Propagation Tool (EPT) and the resistivity of invaded zones (Rxo) as the main input for estimating m. A method to calculate m, n, and a simultaneously when saturation, effective porosity, and resistivity of the sample or zone are available is published by S. M Frailey et al in: "Simultaneous Calculation of Archie Parameters m, n, and a", West Texas Geologic Society Fall Symposium, Proceedings, October 2002, Midland, Tex. (http://www.depts.ttu.edu/peWeb/research/caprs/caprsPapers/ArchieParameters.pdf).

The above examples can only be representative of a very large body of published literature on what is a very active area of investigation in the oilfield industry.

In the view of the above prior art it is seen as an object of the present invention to provide methods for determining reservoir parameters and in particular improved methods for determining the cementation factor or porosity exponent or any mathematically equivalent term.

SUMMARY OF INVENTION

According to a first aspect, this invention relates to a method of determining the effect of formation porosity on formation resistivity and parameters derived from the formation resistivity, including determining for a depth interval in a well traversing the formation a heterogeneity measure of a layer intersected by the well; and using a pre-defined relation to transform the heterogeneity measure into an algebraic term determining the effect of the formation porosity on the formation resistivity.

In a preferred embodiment, the effect of the formation porosity on the formation resistivity is determined using an algebraic relation between formation resistivity and porosity. The most widely used of such relations is known as Archie's law.

In a further preferred embodiment of the present invention, the method includes the step of processing a resistivity maps of subsequent circumferential zones around the well into a measure for the resistivity heterogeneity of such a zone. In turn, the resistivity heterogeneity can be transformed into an algebraic term which determines the effect of the formation porosity on the formation resistivity. When using types of Archie's law, this algebraic term is preferably the cementation factor or exponent.

According to a preferred variant of this embodiment, zonal resistivity maps or images are each converted into characterizing values by determining the relative proportion of the area or volume having a resistivity higher than a threshold. The value of this threshold is a design parameter and can be defined in view of various objectives, for example minimizing noise or purely statistical fluctuations.

According to another aspect of the invention, the method can thus provide a depth dependent log of cementation values, which in turn can be used to determine other formation parameters such as saturations when combined with standard log measurements.

These and other aspects of the invention are described in greater detail below making reference to the following drawings.

DETAILED DESCRIPTION

The following example makes use of tools and methods known per se in the art but previously used for different purposes.

Figure 1A:
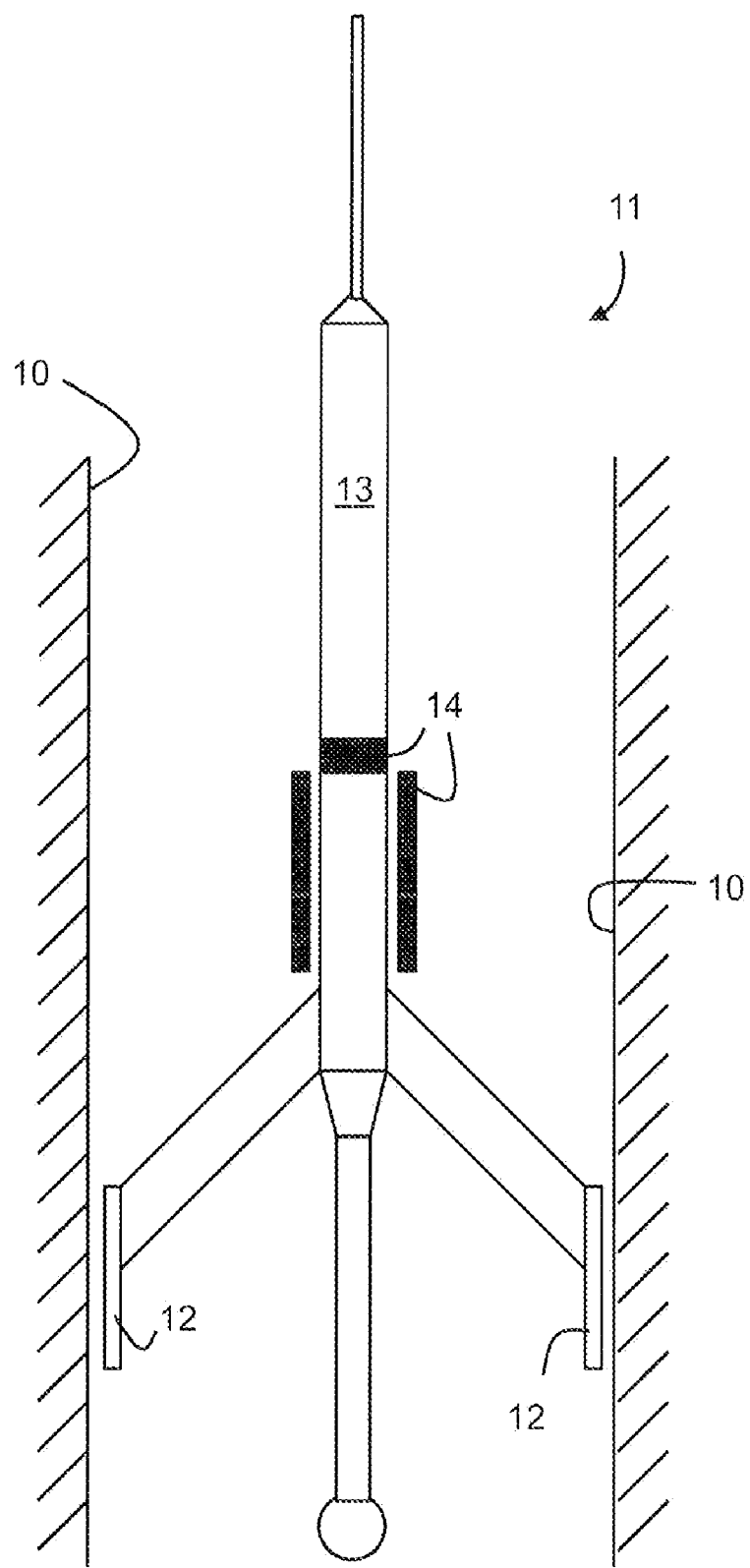
FIG. 1A shows a known logging tool capable of providing zonal resistivity maps as used in an example of the present invention.

An example of these known tools and methods is shown in FIG. 1. The figure shows a borehole with a formation resistivity imaging logging tool. The tool body 11 carries four circumferentially arranged electrode pads 12, which can be extended to contact the borehole wall 10. A current flow is generated between upper electrodes 13 and the electrode pads 12. Insulating parts 14 are arranged in the middle section of the tool to prevent a short-circuiting of the current through the tool body 11. The tool used in the example is the commercially available FMI (TM of Schlumberger) tool.

The FMI tool generates an electrical image of the borehole from 192 microresistivity measurements. Special focusing circuitry ensures that the measuring currents are forced into the formation, where they are modulated in amplitude with the formation conductivities to produce both low-frequency signals representative of petrophysical and lithological information and a high-resolution component that provides the microresistivity data used for generating images and for dip interpretation. The depth of investigation is about 30 inches for the low frequency signal, similar to that of shallow lateral resistivity devices, while the depth of investigation is less than an inch for the high frequency component. The image is normalized through calibration with low-frequency, deeper resistivity measurements from another resistivity measurement tool.

Figure 1B:
FIG. 1B illustrates a step within an example of the present invention.

In accordance with this example of the invention, the FMI image resistivity is calibrated to other resistivity logs such as focused laterologs or induction logs which are well-known logging tools and measurements in the industry. This image calibration can be an important step where the current flowing through the FMI electrodes is not collimated, hence does not give an accurate measure of the formation's resistivity. The example of a calibrated resistivity map or image is shown in FIG. 1B.

The map shows a vertical and azimuthal resolution of 0.2 in. This means that the dimensions of any feature that is 0.2 in. or larger can be readily estimated from the image. The size of features smaller than 0.2 in. can be estimated by quantifying the current flow to the electrode. Fine-scale details such as 50-micron fractures filled with conductive fluids are visible on FMI logs. The resulting map is then further processed to derive a homogeneity value as will be described in more detail below.

Figure 2:
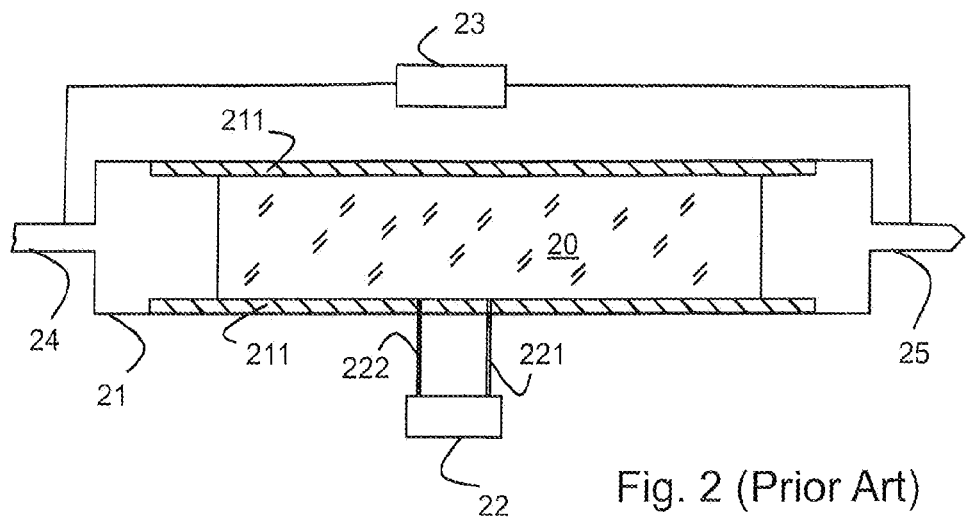
FIG. 2 shows a known tool to perform measurements on rock cores.

A second known method applied in the present invention is the resistivity measurement on cores. Such measurements have been routinely performed in laboratories for many decades. A typical though simplified setup for such measurements is illustrated using FIG. 2 of U.S. Pat. No. 4,924,187 to E. Sprunt et al. In this setup, a core 20 is placed in a container 21 enclosed in a compliant material 211 to provide pressure tight sealing around the core 20. The electrodes 221, 222 of the resistivity meter 22 contact the surface of the core 20 at two or more points to determine the resistivity of a section of core in the presence of a DC or AC current. Also shown is a current source 23 to generate a current along the core length. Two ports 24, 25 allow the core to be flooded with a fluid to change the saturation of it in a controlled manner The example as shown can be replaced by many alternatives. In modern measurements, the efforts made to establish a controlled environment are for example more developed as illustrated by the setups described in U.S. Pat. No. 5,493,226 to M. M. Honarpour et al., U.S. Pat. No. 6,879,154 to M. Fleury, and many other published sources.

With the knowledge of the other parameters, such as saturation S, the measurement of core resistivity can be used to determine the cementation factor m as defined by Archie (eq. [1]).

After the FMI image is recorded at a given depth, it is processed to extract from it a measure of the heterogeneity of the resistivity of the sampled area or volume. This measure is referred hereinbelow as resistive heterogeneity. It is convenient to reduce the resistive heterogeneity of an image to a single value. This can be achieved by determining for example the ratio of high resistivity areas or volumes to the total areas or volumes scanned by the FMI images or by any other equivalent method. The threshold value for high resistivity areas can be set arbitrarily. It is however advantageous to set the threshold such that only clearly recognizable patches of higher resistivity contribute to the heterogeneity measure without being affected for example by the fluid type in the rocks.

It is important to note that the resistive heterogeneity thus measured is effectively a value averaged along a circumference of the well. It can therefore be regarded as a good representative value for the section of a layer as intersected by the well at the given depth.

Figure 3:
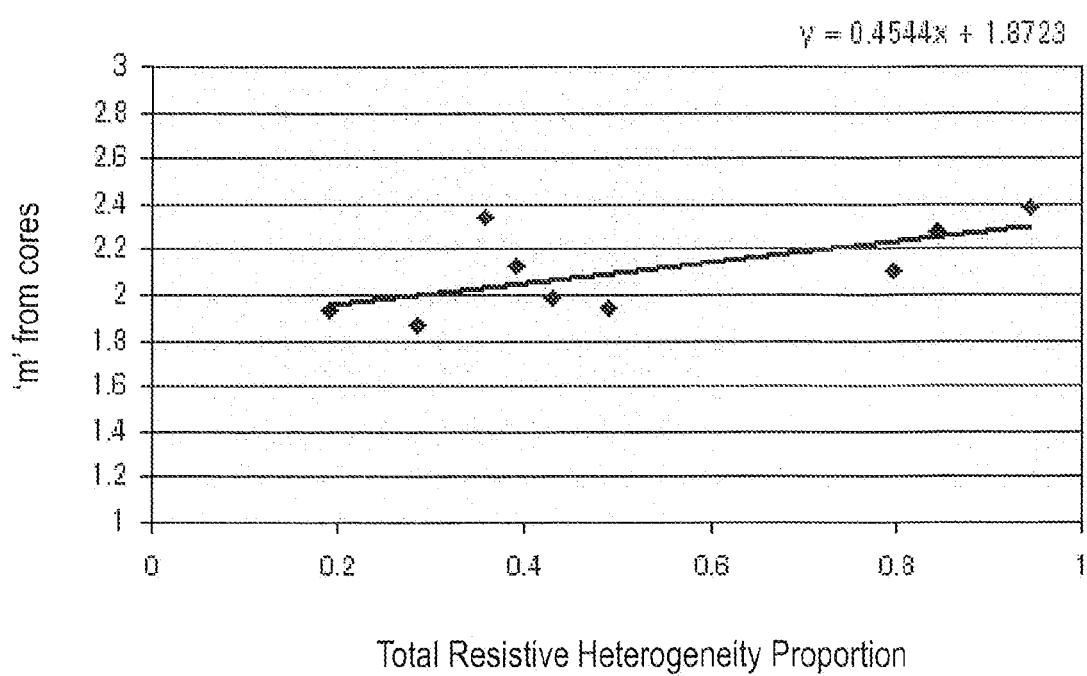
FIG. 3 is a graph used to establish a relation between a heterogeneity measure and the Archie cementation exponents as per an example of the present invention.

By cross-plotting the cementation values m of core samples and the resistive heterogeneity measure a correlation between these values may be observed as evidenced by the plot of FIG. 3. The observed correlation can be converted into a mathematical relation which transforms the resistive heterogeneity measure derived from an FMI image directly into a value of m without requiring further core measurements.

In the present example the data points of FIG. 3 are fitted by linear function $$m = 0.4544 * RHM + 1.8723, \quad [6]$$

where RHM stands for the resistive heterogeneity measure. Other types of linear or non-linear fits can be used to derive a general relation between m and the resistive heterogeneity.

In a well or reservoir where such a relation as eq. [6] between cementation factor and resistive heterogeneity measure has been established, it is possible to determine a depth dependent log of cementation factors similar to other log measurement. By applying the relation and above described methods to logging measurements of the FMI or similar logging tool, a cementation factor log can be generated from data already measured or given such a relation the FMI tool or any similar tool can modified to generate a cementation factor log in real-time.

Figure 4:
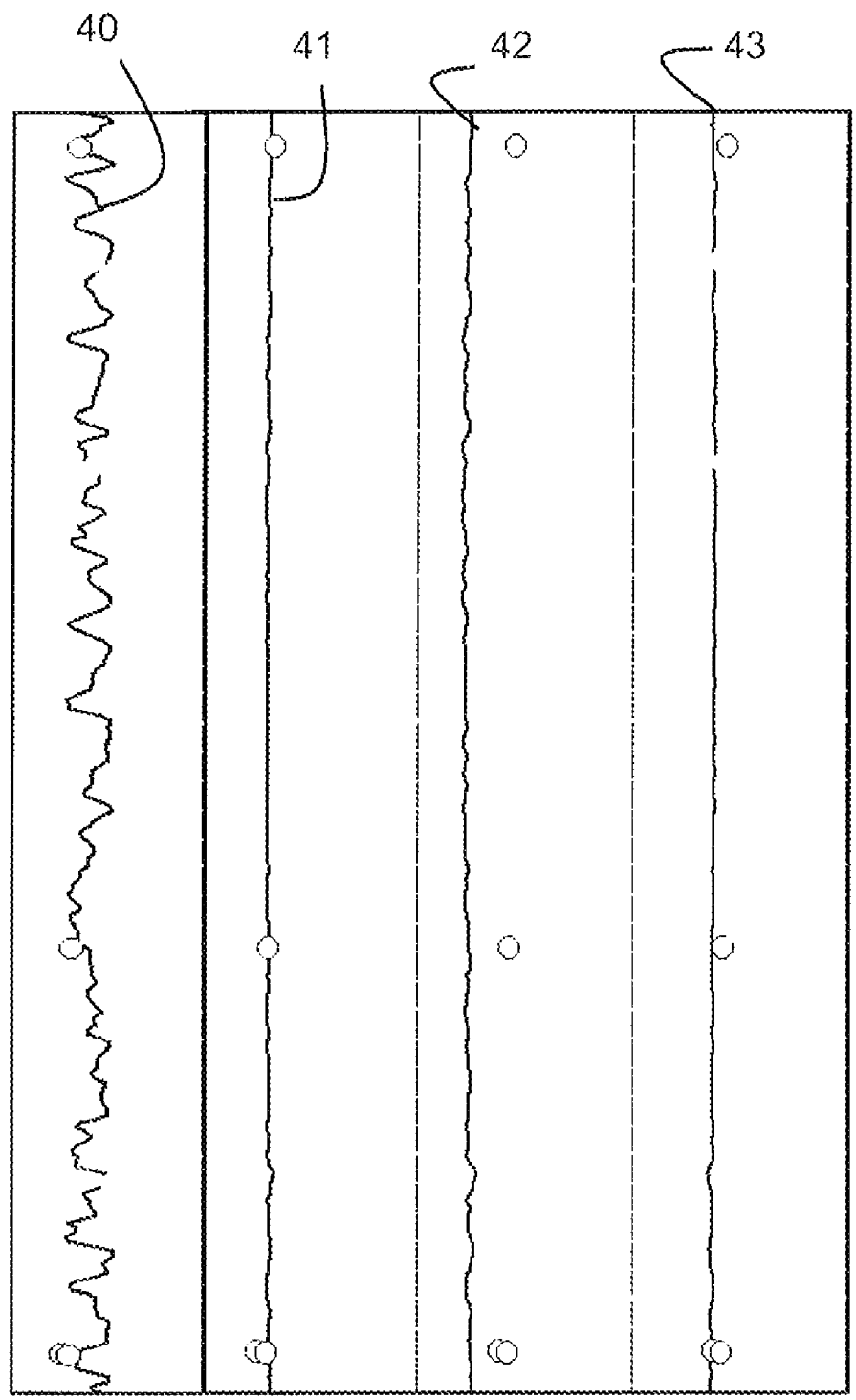
FIG. 4 compares the results in accordance with an example of the present invention with known methods of determining the Archie cementation exponents.

An example of such a log is shown in FIG. 4. The figure shows about 40 depth meters of log. Starting from the left, the first curve 40 indicates the values of the cementation factor as derived from the equation [6]. The three following curves 41, 42, and 43 are based on the empirical relationship between porosity measurement and cementation factor of equations [2], [4] and [5], respectively. The values as measured by core experiments are shown in all four plots as circles. The horizontal scale for all curves and cores read 1.0 on the left edge and 4.0 on the right edge of the tracks. Thus the curves 41, 42, and 43 are close to the value of 2 in line with the manner in which they are calculated, whereas the measurement in accordance with the present invention has a higher degree of fluctuation as expected from a true depth-point by depth-point logging measurement.

With the exponent m known, the saturation at any given depth in the logged well can be established using the above Archie law.

What is claimed is:

1. A computer-implemented method of determining the effect of formation porosity on formation resistivity and parameters derived from the formation resistivity, the method comprising the steps of:

for a depth interval in a well traversing the formation determining a resistive heterogeneity measure depending on depth from electrical borehole images acquired with a imaging logging tool device;

using a pre-defined relation to transform the resistive heterogeneity measure into an algebraic term determining the effect of the formation porosity on the formation resistivity; and wherein the pre-defined relation is based on comparing the resistive heterogeneity measure with the effect of formation porosity on formation resistivity as measured on rock cores with a core measuring device.

2. The computer-implemented method in accordance with claim 1, wherein the resistive heterogeneity measure is derived from a measurement of the resistivity distribution in an area or a volume of the formation, the area or volume being located circumferentially around the well.

3. The computer-implemented method in accordance with claim 1, wherein the resistive heterogeneity measure is derived from a measurement of the resistivity distribution in an area or a volume of the formation, the area or volume being located circumferentially around the well, and determining the relative proportion of a high resistivity area or volume within the area or volume.

4. The computer-implemented method in accordance with claim 3, wherein the high resistivity area or volume is defined by a threshold value.

5. The computer-implemented method in accordance with claim 3, wherein the measurement of the resistivity distribution in an area or a volume of the formation includes resistivity maps of subsequent circumferential zones around the well.

6. The computer-implemented method in accordance with claim 1, wherein the effects of the formation porosity on the formation resistivity is defined by an Archie law or an equivalent relationship.

7. The computer-implemented in accordance with claim 6, wherein the effects of the formation porosity on the formation resistivity is determined by the value of the cementation factor in the Archie law.

8. The computer-implemented method in accordance with claim 7, further comprising the step of generating a depth dependent continuous log of values for the cementation factor.

9. The computer-implemented method in accordance with claim 1, further comprising the step of determining the water saturation of the formation.

* * * * *